(No Model.)

J. C. BEACH.
CAR WHEEL.

No. 342,170. Patented May 18, 1886.

Witnesses:
Robt. F. Gaylord
Robt. H. Duncan

Inventor
James C. Beach

UNITED STATES PATENT OFFICE.

JAMES C. BEACH, OF BLOOMFIELD, NEW JERSEY.

CAR-WHEEL.

SPECIFICATION forming part of Letters Patent No. 342,170, dated May 18, 1886.

Application filed March 31, 1886. Serial No. 197,233. (No model.)

*To all whom it may concern:*

Be it known that I, JAMES C. BEACH, of Bloomfield, in the county of Essex and State of New Jersey, have invented certain new and useful Improvements in Car and Locomotive Wheels; and I do hereby declare that the following is a full, clear, and exact description of the invention, which will enable others skilled in the art to which it appertains to make and use the same.

The present invention relates to that class of wheels in which the tire, hub, or body, or part lying between the tire and the hub, are separable from each other, and are secured together to form a completed wheel by means of bolts or rivets.

The object of the invention is to provide a secure attachment of the body of the wheel to the hub, to strengthen the attached parts against breakage, and in case breakage should occur to prevent the hub from being pushed outward through the body of the wheel; and the invention consists, generally, in forming an enlargement upon or increasing the diameter of the hub adjacent its securing-flange, and combining such enlarged hub with the body of the wheel, substantially as hereinafter described.

Figure 1:
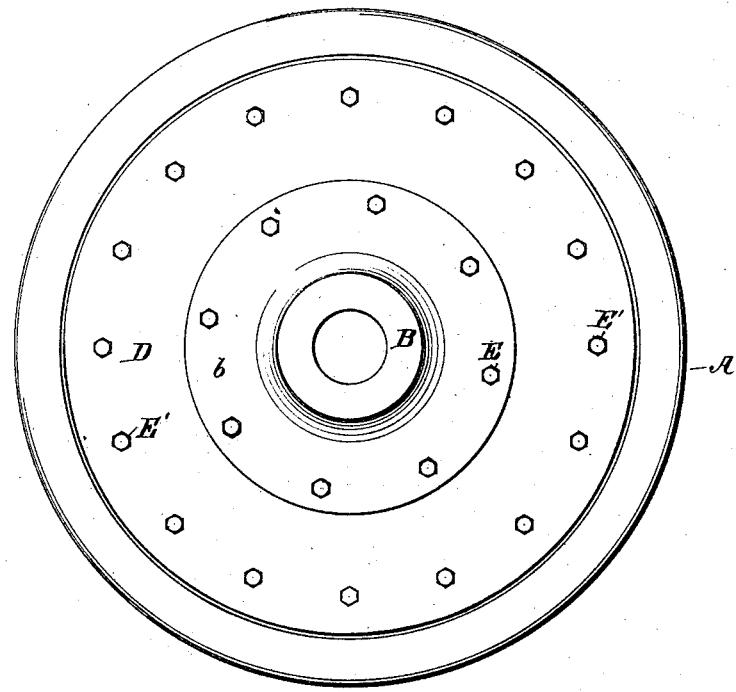
Figure 2:
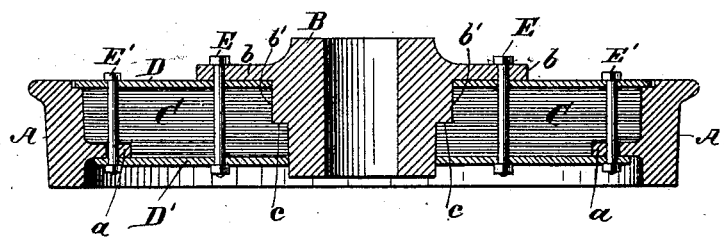

The invention is illustrated in the accompanying drawings, in which Figure 1 is an elevation of the inner side or face of the wheel, and Fig. 2 is a central section of the same.

In the drawings, A represents the tire; B, the hub; C, a core inclosed laterally by the side plates, D and D', the core and the side plates forming the body of the wheel. The tire may be of any suitable material, and may be attached and secured to the body by a series of bolts, E', passing through the side plates, D and D', the core C, and a web, $a$, projecting inwardly from the tire, as fully shown in Fig. 2 of the drawings. Any other way of uniting the tire to the body of the wheel may be employed, as the invention does not specially relate to this portion of the wheel.

In car-wheels of this class, in which the body of the wheel has been secured to the hub by bolts passing through a flange of the hub overlapping the body, the overlapping flange sustains great strains received upon the flange of the tire by its pressure and blows against the rail, and communicated to the flange of the hub through the body of the wheel. The result has frequently been to break the flange at its angle with the hub and leave the hub free to be pushed outward through the body of the wheel.

In Fig. 2 of the drawings, $b$ represents the overlapping hub-flange, secured to the body of the wheel by a series of bolts, E, and $b'$ represents an enlarged or increased diameter of the hub, having a shoulder, $c$, in contact with the body of the wheel. It is plain that this construction largely increases the strength of the parts at the angle of the flange with the hub over what would be the case were the smaller diameter of the hub continued inward to the plane of the flange, and consequently diminishes the liability of breaking the flange. It is also plain that the shoulder $c$, by its close contact with the body of the wheel, receives and distributes a portion of the strain which would otherwise be received by the flange; also, in case the flange should be broken, the hub is effectually stopped from working outward by the contact of its enlarged diameter with the body of the wheel.

It is observed that the invention is not limited to an enlarged diameter of the hub, having a vertical shoulder, $c$, as shown in the drawings, as it is evident that this shoulder may be inclined or sloped upward toward the flange $b$ and substantially the same object be attained.

What I claim as new is—

In a car-wheel in which the hub and the body of the wheel are separable and are united by bolts passing through the body and a flange of the hub, an enlargement upon the hub adjacent to its securing-flange, in combination with the body of the wheel, substantially as and for the purposes set forth.

JAMES C. BEACH.

Witnesses:
ROBT. H. DUNCAN,
H. F. NEWBURY.